No. 752,135. PATENTED FEB. 16, 1904.
C. H. WEBER.
FERTILIZER SPREADER.
APPLICATION FILED OCT. 12, 1903.
NO MODEL. 3 SHEETS—SHEET 1.

WITNESSES:
H. B. Bradshaw
A. L. Phelps

INVENTOR.
Charles H. Weber
BY
C. C. Shepherd
ATTORNEY.

No. 752,135. PATENTED FEB. 16, 1904.
C. H. WEBER.
FERTILIZER SPREADER.
APPLICATION FILED OCT. 12, 1903.
NO MODEL. 3 SHEETS—SHEET 2.

WITNESSES:
H. B. Bradshaw
Louise Shepherd

INVENTOR.
Charles H. Weber
BY
C. C. Shepherd
ATTORNEY.

No. 752,135. PATENTED FEB. 16, 1904.
C. H. WEBER.
FERTILIZER SPREADER.
APPLICATION FILED OCT. 12, 1903.
NO MODEL. 3 SHEETS—SHEET 3.

WITNESSES:
H. B. Bradshaw
A. L. Phelps

INVENTOR.
Charles H. Weber
BY
C. C. Shepherd
ATTORNEY.

No. 752,135. Patented February 16, 1904.

UNITED STATES PATENT OFFICE.

CHARLES H. WEBER, OF ALTON, OHIO.

FERTILIZER-SPREADER.

SPECIFICATION forming part of Letters Patent No. 752,135, dated February 16, 1904.

Application filed October 12, 1903. Serial No. 176,689. (No model.)

*To all whom it may concern:*

Be it known that I, CHARLES H. WEBER, a citizen of the United States, residing at Alton, in the county of Franklin and State of Ohio, have invented a certain new and useful Improvement in Fertilizer-Spreaders, of which the following is a specification.

My invention relates to the improvement of fertilizer-spreaders; and the objects of my invention are to provide a simple and effective construction of fertilizer or manure spreader by means of which fertilizing material may be uniformly and effectively distributed from a wagon-bed, to provide in conjunction therewith improved means for separating and discharging the material from the wagon-bed, to provide improved means for regulating the descent of the conveyer-frame, and to produce other improvements the details of which will be more fully pointed out hereinafter. These objects I accomplish in the manner illustrated in the accompanying drawings, in which—

Figure 1:
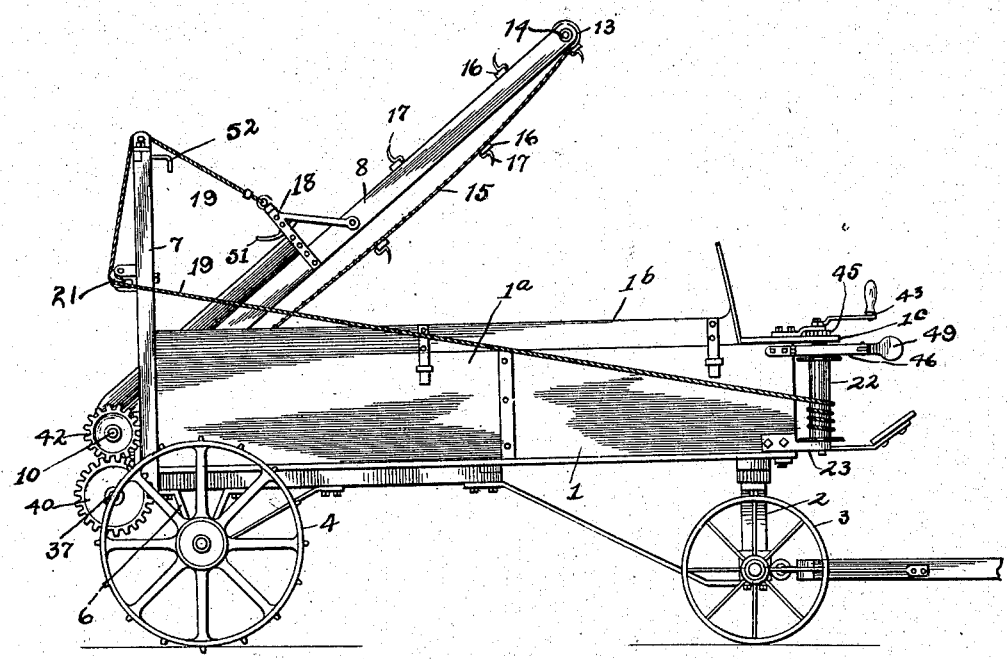
Figure 2:
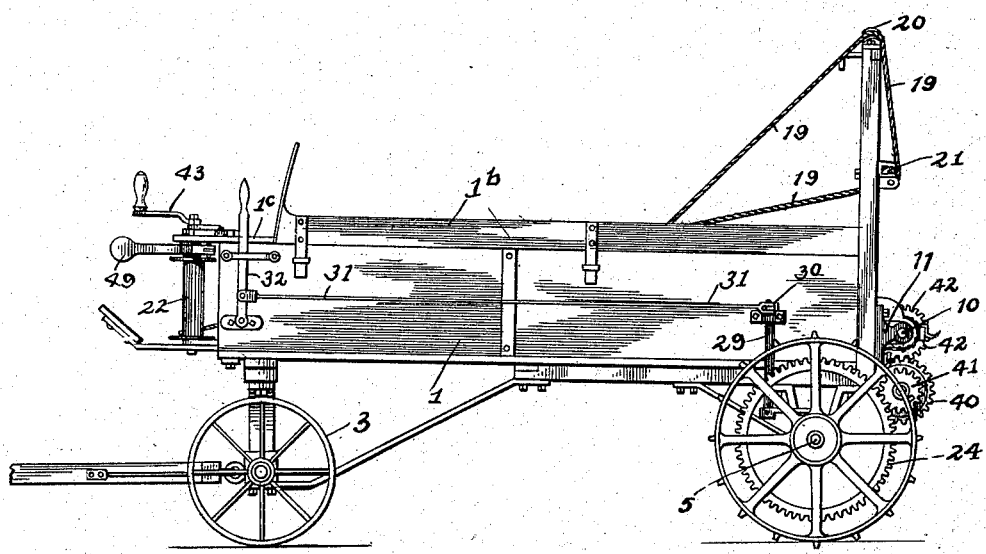
Figure 3:
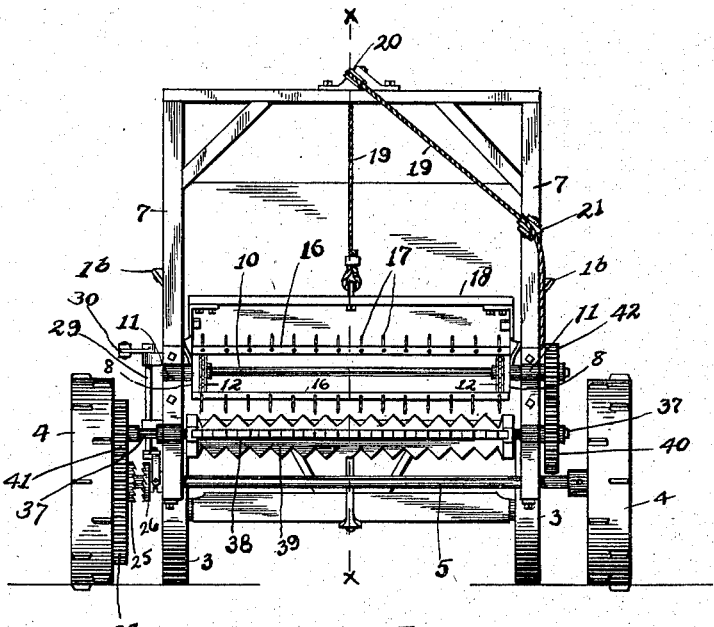
Figure 4:
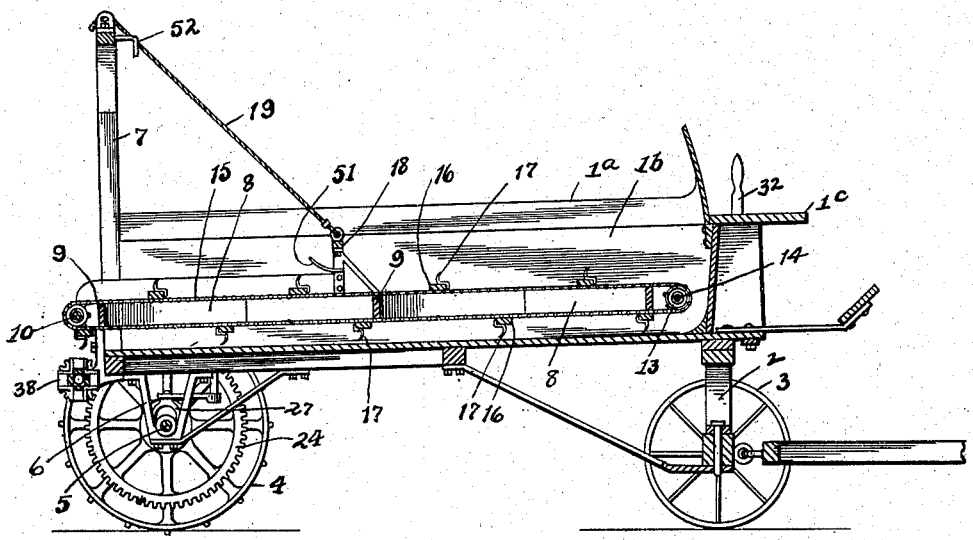
Figure 5:
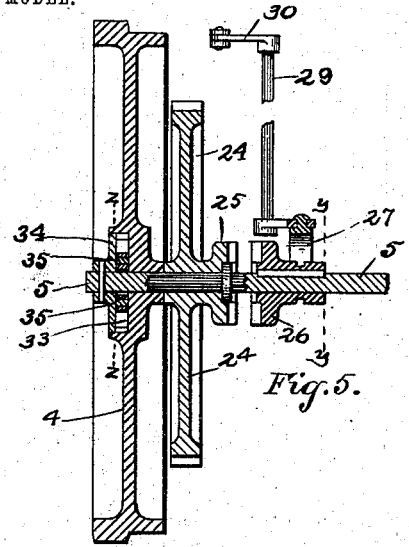
Figure 6:
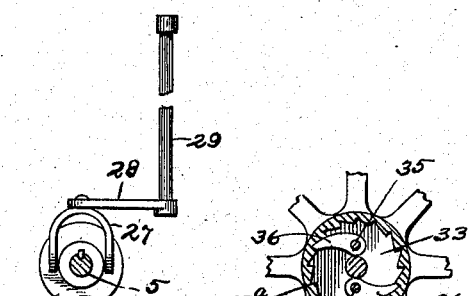
Figure 7:
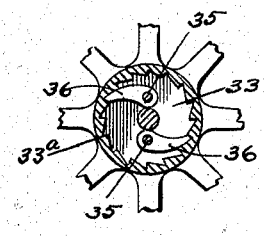
Figure 8:
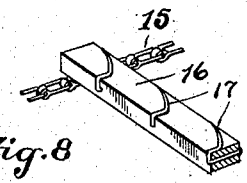
Figure 9:
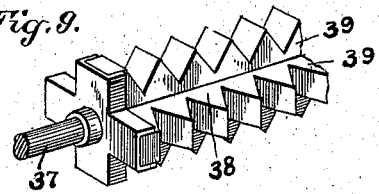
Figure 10:
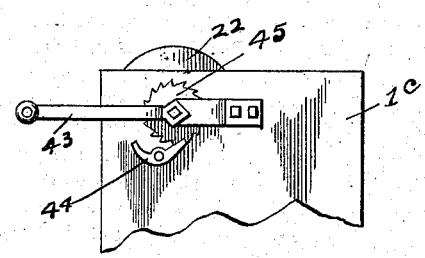
Figure 11:
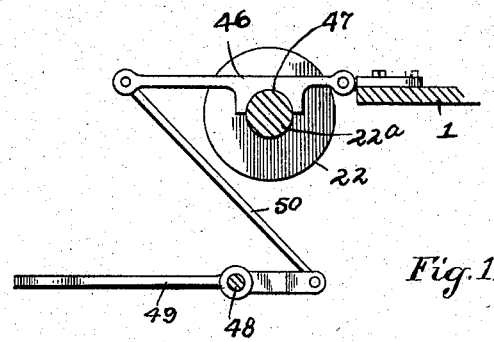

Figure 1 is a side elevation of my improved machine, showing the conveyer-frame elevated. Fig. 2 is a view in elevation of the opposite side of the machine from that shown in Fig. 1, with the conveyer-frame in its lowered position. Fig. 3 is a rear end view of the machine. Fig. 4 is a central longitudinal section of the same on line $x\, x$ of Fig. 3. Fig. 5 is an enlarged central vertical section through one of the rear ground-wheels, a portion of the axle and parts mounted thereon. Fig. 6 is a transverse section on line $y\, y$ of Fig. 5. Fig. 7 is a sectional view on line $z\, z$ of Fig. 5. Fig. 8 is a detail view in perspective of portions of one of the conveyer chain belts and one of the cross-bars which connect the same. Fig. 9 is a similar view in perspective of a portion of the discharging and separating device. Fig. 10 is a plan view of one end of the seat, showing the windlass-operating device; and Fig. 11 is an enlarged transverse section of the upper portion of the windlass, showing a plan view of a brake which I employ in the manner hereinafter described.

Similar numerals refer to similar parts throughout the several views.

In carrying out my invention I employ a suitable wagon-bed 1, the bottom of which is preferably slightly inclined downwardly toward its rear end, said wagon-bed having its front truck 2 extended downwardly to form a comparatively low bearing for the small forward ground-wheels 3 to permit of the latter being readily turned beneath the bed of the wagon. The rear portion of the wagon is supported upon larger ground-wheels 4, which are mounted loosely on the outer end portions of a transverse axle or shaft 5, said axle being journaled in suitable truck-hangers 6. As indicated in the drawings, the sides $1^a$ of the wagon-bed are preferably provided with upwardly-extending and outwardly-flaring extensions $1^b$, and the forward end of the bed is provided with a suitable transverse seat-board $1^c$. Rising from opposite sides of the wagon-bed at the rear end thereof are the vertical standards of an upright frame 7.

8 represents the parallel side boards of a conveyer-frame, said side boards being connected at suitable points by cross-pieces 9. This conveyer-frame has its side pieces 8 pivotally mounted at their rear ends on a transverse shaft 10, the outer ends of which are journaled in suitable bearings 11 on the rear standards of the frame 7. On the inner sides of the side pieces 8 the shaft 10 carries sprocket-wheels 12, and similar wheels 13 are carried on a transverse shaft 14, which is mounted between the forward ends of the side frame-pieces 8. The forward and rear sprocket-wheels are connected by two parallel chain belts 15, and these belts are connected at intervals by transverse bars 16, having separated hook or tooth like projections 17. The conveyer-body thus formed is adapted, as shown in the drawings, to extend within the wagon-bed to a point in the forward end thereof. The conveyer side frames are bridged by a yoke-like frame 18, with which is connected one end of a rope 19, which extending rearwardly and upwardly runs over a pulley 20, which is mounted upon the top bar of the frame 7, said pulley being pivoted at an angle or inclination from the direction of the length of said top bar. From the pulley 20 the rope 19 leads downwardly and outwardly over an inclined pulley 21, mounted in the bracket of one of the standards of the frame 7, and from said pulley 21 the rope extends forward along the outer side of the wagon, as shown more clearly in Fig. 1 of the drawings, to and about a vertical windlass or reel-body 22, which is journaled between one end of the seat-board 1ᶜ and a forwardly-extending bracket 23.

Upon the rear axle or shaft 5 and on the inner side of one of the ground-wheels 4 is loosely carried a gear-wheel 24, the latter having a suitable form of clutch-hub 25, which is adapted to interlock with a clutch-section 26, which is keyed to slide on said shaft 5 on the inner side of the wheel 24. The clutch hub-section 26 has connected therewith in the usual manner an operating-yoke 27, with which is connected an arm 28 of a journaled vertical shaft 29, the latter having a top arm 30. With the arm 30 is jointedly connected one end of an operating-rod 31, which, as shown more clearly in Fig. 2 of the drawings, extends forwardly and has its forward end pivotally connected with an operating-lever 32, the lower end of which is pivoted to the wagon-bed seat. The hub of each of the ground-wheels 4 is provided with an outer side recess, as indicated at 33 in Figs. 5 and 7, and within this recess is fitted a disk 34, which is rigidly connected with the shaft 5 and which has pivoted on inwardly-projecting pins 35 thereof pawls 36, the latter being adapted, as shown, to successively engage internal teeth 33ᵃ of the recessed portion of the wheel-hub. As shown, these pawls are arranged in the well-known manner to produce a driving connection between the ground-wheels and shaft 5 only when the machine is moving in the forward direction.

In rear of the wagon-bed bottom and slightly below the latter are journaled the end spindles 37 of a rotary separating and distributing body 38. As indicated more clearly in Fig. 9 of the drawings, this separating and distributing body comprises a plurality of toothed bars 39, the apex or bases of which are so connected as to result in the adjacent rows of teeth projecting at right angles with each other. On the outer ends of the spindles 37 are carried pinions 40 and 41, the latter meshing with the teeth of the heretofore-described gear-wheel 24. The wheel 40 gears with a wheel 42, carried on one of the outer ends of the conveyer-shaft 10.

The upper end of the windlass or reel-body 22 carries an operating crank-handle 43, and said reel is prevented from reversed rotation by the engagement of a pivoted pawl 44 (see Fig. 10) with the teeth of a ratchet-wheel 45, which is carried on the upper extension of said reel. In order to regulate the speed of the reel 22 in unwinding, and consequently regulate the lowering of the conveyer-frame, I employ a friction brake-bar 46, the latter having one of its ends suitably hinged in connection with the wagon-bed and having an enlarged portion formed with a semicircular recess 47, which is adapted to partially embrace the upwardly-extending spindle 22ᵃ of the windlass or reel. Beneath the seat-board is fulcrumed at 48 a lever 49, one end of which is jointedly connected with the outer end of the brake-bar 46 by a connecting-rod 50.

Extending rearwardly and upwardly from each of the side arms of the yoke 18 at points above the chain belts 15 are curved guard-fingers 51, the latter serving to prevent an undesirable lifting or upward movement of said chains.

In utilizing my herein-described machine it will be understood that prior to loading the wagon-bed with the fertilizing material the reel or windlass 22 is rotated and the rope 19 wound thereon until the conveyer-frame is lifted to an upright position at the rear of said wagon-bed, and when the loading is completed the conveyer-frame is lowered on to the load, said frame gradually feeding downward as the load is discharged. The operation of discharging the load is as follows: When the machine is moving forward, motion is contributed from one of the ground-wheels to the gear-wheel 24, thence to the pinion 41, shaft 37, pinions 40 and 42, and shaft 10. Through these connections the separating and discharging roll 38 has imparted thereto a rotary motion, and a traveling motion is imparted to the conveyer-chains and their two cross-pieces. The engagement of the hook-tooth 17 with the material results in the latter being gradually carried to the rear of the wagon-bed and in its being discharged over the separating-roll 38. It is obvious that the passage of the material between the toothed bars of this separating-roll and the conveyer will tend to separate the material and prevent its being discharged and distributed in undesirable lumps. It will be understood that the above-described operation can only take place when the clutch member 26 is in engagement with the clutch-hub 25 of the gear-wheel 24 and that this engagement is effected by the proper movement of the lever 32. The speed at which the conveyer descends upon the load may be regulated by the driver or operator pressing his knee against the brake-operating lever 49 to effect a desirable friction of the brake-bar 46 with the windlass-spindle 22ᵃ, and thereby control the speed at which said windlass is rotated. When the machine or wagon is backed or reversed, it is obvious that the movement of the discharging mechanism will be discontinued, owing to the failure of the pawls 36 to engage the tooth 33ᵃ of the wheel-hub. In order to assure the conveyer its upright position, the top cross-bar of the frame 7 is provided with an angular hook 52, with which the yoke-frame 18 may be made to engage temporarily.

From the construction and operation described it will be seen that a comparatively simple although effective mechanism is provided for the gradual and uniform discharge of material from a wagon-bed and that simple and reliable means are provided for properly separating the material at the discharge-point.

Having now fully described my invention, what I claim, and desire to secure by Letters Patent, is—

1. In a fertilizer-spreader, the combination with a wagon-bed, its ground-wheels and an upright frame at the rear end of said bed, of a conveyer-frame pivoted at one end, a toothed conveyer carried in said frame, a rope running over said upright bed-frame and a windlass journaled at the forward end of the bed on which said rope is adapted to be wound and means for imparting a traveling motion to said conveyer.

2. In a fertilizer-spreader, the combination with a wagon-bed, its ground-wheels, an upright frame at the rear of the bed, and pulleys mounted thereon, of a conveyer-frame pivoted at the rear of the bed, a conveyer mounted in said frame comprising parallel endless belts and connecting toothed crossed bars, a rope running from said conveyer-frame over said upright frame pulleys, a windlass rotatably mounted at the forward end of the bed on which said rope is adapted to be wound and a toothed distributing-roll journaled beneath the rear end of said conveyer and means for imparting rotary motion to said roll and a traveling motion to said conveyer.

3. In a fertilizer-spreader, the combination with a wagon-bed, its ground-wheels, an upright frame at the rear of the wagon-bed, a swinging frame pivoted at the rear end of the bed, and an endless conveyer carried by the swinging frame, of a windlass at the forward end of the bed, a cable connected to the swinging frame and the windlass and also running over the upright frame, a friction brake-bar hinged to the bed and adapted to engage the windlass, a knee-operated lever connected with the brake-bar, and means for imparting a traveling motion to said conveyer.

CHARLES H. WEBER.

In presence of—
C. C. SHEPHERD,
W. L. MORROW.